(12) United States Patent
Kwun et al.

(10) Patent No.: US 8,934,903 B2
(45) Date of Patent: Jan. 13, 2015

(54) MOBILE TERMINAL AND COMMUNICATION METHOD THEREOF, BASE STATION CONTROLLER AND CONTROL METHOD THEREOF, AND MULTI-COOPERATIVE TRANSMISSION SYSTEM USING THE SAME AND METHOD THEREOF

(75) Inventors: Jong-Hyung Kwun, Seoul (KR); Yung-Soo Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 322 days.

(21) Appl. No.: 13/594,561

(22) Filed: Aug. 24, 2012

(65) Prior Publication Data
US 2013/0053079 A1 Feb. 28, 2013

(30) Foreign Application Priority Data

Aug. 24, 2011 (KR) .......................... 10-2011-0084488

(51) Int. Cl.
*H04W 36/00* (2009.01)
*H04B 7/02* (2006.01)
(Continued)

(52) U.S. Cl.
CPC .............. *H04B 7/024* (2013.01); *H04B 7/0617* (2013.01); *H04J 11/0053* (2013.01); *H04L 5/0035* (2013.01); *H04B 7/0404* (2013.01)
USPC .... 455/436; 455/450; 370/395.4; 370/395.41

(58) Field of Classification Search
CPC .... H04B 7/024; H04B 7/0617; H04B 7/0404; H04J 11/0053; H04L 5/035
USPC ........ 455/422.1, 435.1, 435.2, 436–444, 560, 455/450–453, 464; 370/395.4, 395.41, 332; 375/E7.141

See application file for complete search history.

(56) References Cited

U.S. PATENT DOCUMENTS

| | | | |
|---|---|---|---|
| 2002/0071403 A1* | 6/2002 | Crowe et al. | 370/331 |
| 2002/0137538 A1* | 9/2002 | Chen et al. | 455/550 |

(Continued)

FOREIGN PATENT DOCUMENTS

| | | |
|---|---|---|
| KR | 10-2011-0004802 | 1/2011 |
| KR | 10-2011-0020352 | 3/2011 |

(Continued)

OTHER PUBLICATIONS

Extended European Search Report dated Nov. 23, 2012 in connection with European Patent Application No. 12181434.7, 9 pages.

(Continued)

*Primary Examiner* — Dominic E Rego

(57) ABSTRACT

A wireless communication system includes a mobile terminal, a controller, and at least one base station. A mobile terminal has an array antenna and searches for neighbor base stations. The controller determines an active set for multi-cooperative transmission/reception with respect to the mobile terminal among searched neighbor base stations, and schedules beam transmission of each base station included in the determined active set. The at least one base station performs transmission/reception with the mobile terminal using beamforming in an ultra high frequency band, and provides resource information regarding uplink/downlink of each base station included in the active set to the mobile terminal based on the scheduling by the controller.

20 Claims, 13 Drawing Sheets

(51) Int. Cl.
*H04B 7/06* (2006.01)
*H04J 11/00* (2006.01)
*H04L 5/00* (2006.01)
*H04B 7/04* (2006.01)

(56) References Cited

U.S. PATENT DOCUMENTS

| | | | |
|---|---|---|---|
| 2003/0117977 A1* | 6/2003 | Kang | 370/331 |
| 2003/0117996 A1* | 6/2003 | Lim et al. | 370/350 |
| 2005/0288027 A1 | 12/2005 | Cho et al. | |
| 2006/0009224 A1 | 1/2006 | Lim et al. | |
| 2006/0023803 A1* | 2/2006 | Perlman et al. | 375/267 |
| 2006/0133308 A1* | 6/2006 | Madan | 370/328 |
| 2008/0305790 A1* | 12/2008 | Wakabayashi | 455/434 |
| 2009/0275337 A1* | 11/2009 | Maeda et al. | 455/442 |
| 2010/0172309 A1* | 7/2010 | Forenza et al. | 370/329 |
| 2010/0273503 A1* | 10/2010 | Tiedemann et al. | 455/453 |
| 2010/0291940 A1 | 11/2010 | Koo et al. | |
| 2011/0044294 A1 | 2/2011 | Lie et al. | |
| 2011/0211547 A1 | 9/2011 | Kim et al. | |
| 2012/0106516 A1* | 5/2012 | Jung et al. | 370/331 |
| 2012/0170619 A1 | 7/2012 | Chang et al. | |
| 2012/0172041 A1* | 7/2012 | Krishnamurthy et al. | 455/436 |
| 2013/0210433 A1* | 8/2013 | Lee et al. | 455/435.1 |

FOREIGN PATENT DOCUMENTS

| | | |
|---|---|---|
| KR | 10-2011-0063584 | 6/2011 |
| WO | WO 2010/050718 A2 | 5/2010 |
| WO | WO 2010/064856 A2 | 6/2010 |
| WO | WO 2011/043720 A1 | 4/2011 |
| WO | WO2011/071470 A1 | 6/2011 |

OTHER PUBLICATIONS

International Search Report dated Feb. 27, 2013 in connection with International Application No. PCT/KR20121006684, 3 pages.

Written Opinion of International Searching Authority dated Feb. 27, 2013 in connection with International Application No. PCT/KR2012/006684, 5 pages.

* cited by examiner

MOBILE TERMINAL AND COMMUNICATION METHOD THEREOF, BASE STATION CONTROLLER AND CONTROL METHOD THEREOF, AND MULTI-COOPERATIVE TRANSMISSION SYSTEM USING THE SAME AND METHOD THEREOF

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Aug. 24, 2011 and assigned Ser. No. 10-2011-0084488, the entire disclosure of which is hereby incorporated by reference.

TECHNICAL FIELD OF THE INVENTION

The present disclosure relates to a multi-cooperative transmission/reception system.

BACKGROUND OF THE INVENTION

A wireless communication system includes at least one User Equipment (UE). The UE may be fixed or have mobility, and may be called a different term such as a Mobile Station (MS), a User Terminal (UT), a Subscriber Station (SS), a wireless device, etc. Generally, a base station denotes a fixed station for communicating with a terminal, and may be called a different term such as a Node-B, a Base Transceiver System (BTS), an Access Point (AP), etc.

For efficient system configuration, a wireless communication system has a cell structure. A cell denotes an area obtained by subdividing a wide region into small areas in order to efficiently use a frequency. Generally, a base station is installed at the center of a cell to relay a terminal, and a cell denotes a service area provided by one base station.

When a neighbor cell of a wireless communication system uses the same subcarrier under a multi-cell environment, a reason of interference may be caused to users. This is called an inter-cell interference. More particularly, the inter-cell interference is problematic much to a UE located in the neighborhood of a cell boundary, Transmission from a UE to a base station is called an uplink (UL), and transmission from a base station to a UE is called a downlink (DL). In the DL, a UE located in the neighborhood of a cell boundary receives strong interference from a neighbor cell. In addition, in the UL, a UE located in the neighborhood of a cell boundary not only has a strong interference on a neighbor cell but also has a low transmission rate due to a path loss at a serving cell.

To reduce an inter-cell interference, neighbor cells may be allowed to use different subcarriers, but in this example, a radio resource that may be used by one base station reduces.

A multi-cell cooperative scheme has been proposed to reduce an inter-cell interference under a multi-cell environment. When the multi-cell cooperative scheme is used, a communication performance of a terminal located in the neighborhood of a cell boundary may improve. In this context, various discussions regarding a data transmission and processing method using a multi-cell cooperative scheme are in progress. One of representative schemes is a joint processing scheme of a cooperative Multi-Input Multi-Output (MIMO) type via data sharing. The joint processing scheme may transmit data instantaneously and simultaneously from each base station performing the multi-cell cooperative scheme to a UE, and the UE coherent-combines a signal received from each base station to improve reception performance.

Recently, as a demand for various wireless services increases rapidly, the conventional Radio Frequency (RF) resource used generally is exhausted gradually. As an alternative for this trend, an interest is concentrated on a millimeter wave (mmW) band that has been limited and used for a specific area such as celestial bodies, satellites, a military purpose, etc.

A millimeter wave denotes a radio wave having a wavelength between 1 millimeter and 10 millimeter, and corresponds to a radio frequency between 30 GHz and 300 GHz. According to International Telecommunications Union (ITU), this frequency belongs to an Extremely High Frequency (EHF) band, and this radio wave has a unique propagation characteristic. For example, a millimeter wave has characteristics of having a higher propagation loss compared to a radio wave of a lower frequency, and not passing through an object such as a building, a wall, and a tree branch, and being more sensitive to absorption in the atmosphere, and refraction and diffraction due to a particle such as a raindrop in the atmosphere. In contrast, due to a short wavelength of a millimeter wave, more antennas may be concentrated on a relatively small area. This enables realization of a high gain antenna of a small size.

ITU defines a frequency band of 3 GHz~30 GHz as a Super High Frequency (SHF). Several higher frequencies in the SHF have a characteristic similar to that of a radio wave in an Extremely High Frequency (EHF) band such as realization of a large propagation loss and a high gain antenna of a small size.

In a millimeter wave band, a very large number of spectrums may be used. For example, a frequency in the neighborhood of 60 GHz is typically known as a 60 GHz band, and is available as an unlicensed spectrum in most of countries. In the United States, 7 GHz (57 GHz~64 GHz) of spectrums in the neighborhood of 60 GHz is allocated for an unlicensed use. In addition, on Oct. 16, 2003, Federal Communications Commission (FCC) issued a report titled Report and Order, and FCC allocated 12.9 GHz as a spectrum for high density fixed wireless service in the United States in the relevant report (71-76 GHz, 81-86 GHz, and 92-95 GHz (Here, 94.0-94.1 GHz is used for federal government and so excluded)).

A 71-76 GHz band, a 81-86 GHz band, and a 92-95 GHz band are collectively denoted by an E band. Frequency allocation in the E band is a largest spectrum allocation by FCC, and is fifty times-greater than the entire cellular spectrum.

A millimeter wave band has abundant frequency resources and can use a wide bandwidth, so that the millimeter wave band is advantageous in high speed transmission, and more particularly, the millimeter wave band is used much for transmitting high quality moving images.

Millimeter wave communication using millimeter waves requires beam-forming of Tx/Rx due to the characteristic of the above-described millimeter wave. To apply a multi-cell cooperative scheme to the millimeter wave communication, a UE in a multi-cell cooperative system should simultaneously receive beams transmitted from different directions from a plurality of base stations. However, since one array antenna may receive only a beam of one direction having a maximum Rx antenna gain, a plurality of array antennas should be installed to the UE in order to apply the general multi-cell cooperative scheme to the millimeter wave communication. However, in this example, it is not easy to install a plurality of array antennas due to a limitation in an installation space of the UE and manufacturing costs.

In addition, in example of widening a reception range of one array antenna to simultaneously receive a multi-beam transmitted from a plurality of directions, an Rx antenna gain reduces and accordingly a reception performance and coverage reduce.

In addition, to realize a multi-cell cooperative system, synchronization between base stations within a Cyclic Prefix (CP) needs to be maintained. Since a CP length reduces to 1/10 compared to 4G due to reduction of a coherent time in a millimeter wave band, a separate high performance synchronization system should be established in order to reduce a synchronization error between base stations. Accordingly, the number of base stations that may be included in the multi-cell cooperative system is greatly limited.

SUMMARY OF THE INVENTION

To address the above-discussed deficiencies of the prior art, it is a primary aspect of the present disclosure to provide a mobile terminal that not only can perform multi-cooperative transmission/reception using millimeter wave communication even when one array antenna is mounted but also has alleviated requirements between base stations, a communication method thereof, a base station controller and a control method thereof, and a multi-cooperative transmission/reception system and a method thereof.

In accordance with an aspect of the present disclosure, a multi-cooperative transmission/reception system is provided. The system includes a mobile terminal having an array antenna and searching for neighbor base stations, a controller for determining an active set for multi-cooperative transmission/reception with respect to the mobile terminal among searched neighbor base stations, and scheduling beam transmission of each base station included in the determined active set, and at least one base station for performing transmission/reception with the mobile terminal using beam-forming, in an ultra high frequency band, and providing resource information regarding uplink/downlink of each base station included in the active set to the mobile terminal based on the scheduling by the controller.

In accordance with another aspect of the present disclosure, a mobile terminal is provided. The mobile terminal includes an array antenna for performing beam-forming with at least one base station in an ultra high frequency band, a base station search unit for searching for neighbor communicable base stations and transmitting information regarding the searched base stations to a current serving base station, a resource information receiver for receiving scheduling information regarding beam transmission of the searched base stations and resource information regarding uplink/downlink from a controller based on the transmitted information regarding the base stations, and an antenna controller for controlling the array antenna according to the scheduling information and the resource information to form a beam corresponding to the beam transmission of the neighbor base station and transmit/receive data.

The mobile terminal may further include a data combiner for coherent-combining data received via the beam sequentially formed.

In accordance with further another aspect of the present disclosure, a base station controller is provided. The base station controller includes a base station information receiver for receiving information regarding at least one base station positioned in a neighborhood of a mobile terminal, an active set determining unit for determining an active set with respect to a plurality of base stations received via the base station information receiver, a scheduler for scheduling beam transmission for base stations included in the active set and allocating resource information for uplink/downlink, and a schedule information transmitter for transmitting schedule information and resource allocation information by the scheduler to the mobile terminal via at least one of the base stations included in the active set.

The base station controller may further include an anchor base station determining unit for determining an anchor base station among the base stations included in the active set, and the schedule information transmitter transmits the schedule information and the resource allocation information to the mobile terminal via the anchor base station.

The scheduler schedules beam transmission and allocates resource information so that respective base stations included in the active set do not transmit data during the same slot using a frame subdivided via time division of a slot basis.

In accordance with still another aspect of the present disclosure, a multi-cooperative transmission/reception method is provided. The method includes searching for base stations in a neighborhood of a mobile terminal, determining an active set for multi-cooperative transmission/reception with respect to the mobile terminal among the searched neighbor base stations, scheduling beam transmission of the base stations included in the determined active set, and transmitting resource allocation information for uplink/downlink of respective base stations included in the active set to the mobile terminal based on the scheduling.

Here, the base stations included in the active set and the mobile terminal may perform transmission/reception using beam-forming in an ultra high frequency band.

In this example, the base stations included in the active set and the mobile terminal may perform transmission/reception using beam-forming in a millimeter wave band.

In accordance with yet another aspect of the present disclosure, a communication method of a mobile terminal is provided. The method includes searching for neighbor communicable base stations, transmitting information regarding the searched base stations to a current serving base station, receiving scheduling information regarding beam transmission of the searched base stations and resource information regarding uplink/downlink from a controller based on the transmitted information regarding the base stations, and controlling an array antenna according to the scheduling information and the resource information to form a beam corresponding to the beam transmission of the neighbor base station and transmit/receive data.

The method may further include performing beam-forming according to the scheduling information and the resource information to perform transmission/reception with at least one of the neighbor base stations, and coherent-combining data received from each base station.

The method may further include buffering data received from at least one of the neighbor base stations.

In accordance with still yet another aspect of the present disclosure, a method for controlling a base station is provided. The method includes receiving information regarding at least one base station located in a neighborhood of a mobile terminal, determining an active set for a plurality of base stations received via a base station information receiver, scheduling beam transmission regarding the base stations included in the active set and allocating resource information for uplink/downlink, and transmitting scheduling information and resource allocation information to the mobile terminal via at least one of the base stations included in the active set.

The method may further include determining an anchor base station among the base stations included in the active set. In this example, the transmitting of the scheduling information and the resource allocation information includes transmitting the scheduling information and the resource allocation information to the mobile terminal via the anchor base station.

The transmitting of the scheduling information and the resource allocation information includes transmitting resource information used for communication with the mobile terminal to the mobile terminal via a base station except the anchor base station among the base stations included in the active set.

The transmitting of the scheduling information and the resource allocation information includes transmitting resource information used for communication with the mobile terminal to the mobile terminal via the respective base stations included in the active set.

The transmitting of the scheduling information and the resource allocation information includes transmitting Down Link (DL) MAP information, Up Link (UL) MAP information, and cell Identification (ID) information of the respective base stations included in the active set to the mobile terminal via the anchor base station.

The method may further include determining a base station that transmits the resource information first among the base stations included in the active set as a reference base station. In this example, the transmitting of the scheduling information and the resource allocation information includes allowing the rest of the base stations except the reference base station among the base stations included in the active set to offset by a set time to sequentially transmit the resource information.

The transmitting of the scheduling information and the resource allocation information includes scheduling beam transmission and allocating resource information so that the respective base stations included in the active set do not transmit data during the same slot using a frame subdivided by time division of a slot basis.

According to an exemplary embodiment of the present disclosure, it is possible to obtain an Rx antenna gain with respect to at least one beam while applying a multi-cell cooperative scheme to a wireless communication system.

According to an exemplary embodiment of the present disclosure, it is possible to prevent a wireless link trouble by a rapid channel change by forming a multi-path, and to prevent a ping pong phenomenon by a hard handover.

According to an exemplary embodiment of the present disclosure, even a mobile terminal having one array antenna may receive data from a plurality of base stations and combine the data, and a required synchronization level between base stations may be alleviated.

In addition, according to an exemplary embodiment of the present disclosure, it is possible to increase coverage of a high data rate, and throughput of a cell boundary user may improve.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present disclosure relates to a mobile terminal and a communication method thereof, a base station controller and a control method thereof, and a multi-cooperative transmission/reception system using the same and a method thereof. More particularly, the present disclosure relates to a mobile terminal that can obtain an Rx antenna gain with respect to one or more beams while applying a multi-cell cooperative scheme to a wireless communication system using beam-forming in an ultra high frequency band and a communication method thereof, a base station controller and a control method thereof, and a multi-cooperative transmission/reception system using the same and a method thereof.

Figure 1:
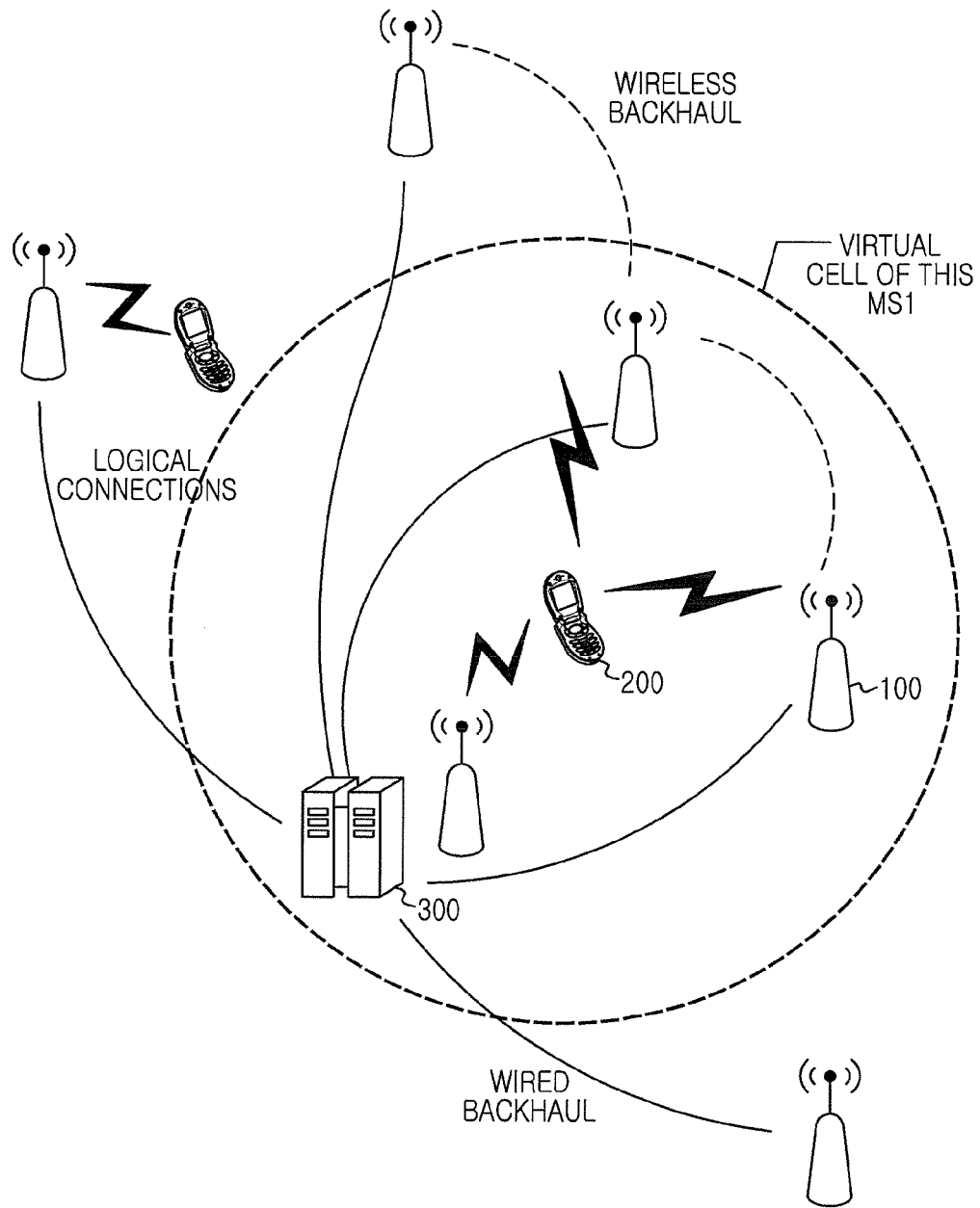
FIG. 1 illustrates a wireless communication system according, to an exemplary embodiment of the present disclosure.

FIG. 1 illustrates a wireless communication system according to an exemplary embodiment of the present disclosure.

Referring to FIG. 1, the wireless communication system may include at least one base station 100, a mobile terminal 200, and a controller 300. Here, the active set is a set of neighbor base stations 100 which are active in a sense that the mobile station 200 can communicate with these base stations through an existing radio channel. In other words, the base station 100 and the controller 300 may be connected to a wired backhaul, and the base station 100 and the base station 100 may be connected to a wireless backhaul.

Figure 2:
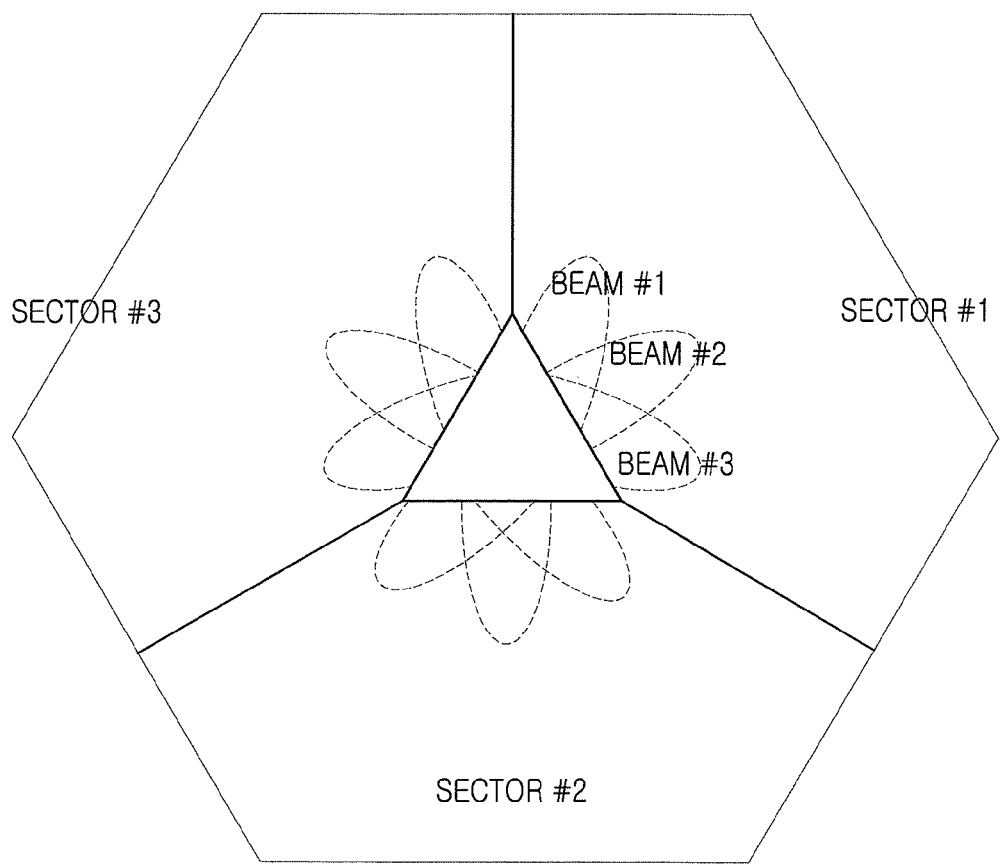
FIG. 2 illustrates beams of a base station that applies a beam-forming technology in a wireless communication system.

The base station 100 performs transmission/reception with the mobile terminal 200 using beam-forming in an ultra high frequency band such as a millimeter wave. A millimeter wave such as a 60 GHz band whose standardization is under progress recently may transmit data at a transmission rate of several Gbps using a wideband in the range of about 2 GHz via a simple modulation scheme. In contrast, the millimeter wave has great disadvantages of strong directionality and a large path loss in an aspect of a high frequency characteristic. Therefore, to complement such disadvantages, a high antenna gain may be obtained by collecting transmission power to a specific direction, not all directions using a directional antenna. For this purpose, as illustrated in FIG. 2, the base station 100 includes a plurality of sectors and may form a plurality of beams having directionality in each sector. When beam-forming is applied, since the range of a signal transmitted via a beam is narrow, the number of beams greater than the number of antennas in a sector should be used to service one base station cell or sector. The mobile terminal 200 may select a best beam from a plurality of beams of the base station 100 depending on motion and movement. Beam selection may frequently occur as a beam width gets narrow. In addition, in the example where the mobile terminal 200 performs beam-forming, a best channel state may be obtained when a beam direction of the base station 100 and a beam direction of the mobile terminal 200 coincide with each other. That is, the mobile terminal 200 may obtain an array gain by finding the direction of a directional antenna via a direction facing the base station 100 or using a beam-forming process for controlling the amplitude or phase of respective antennas forming the array antenna.

The mobile terminal 200 has an array antenna, and may obtain an array gain via a beam-forming process for controlling the amplitude or phase of respective antennas with respect to a beam transmitted from the base station 100. In addition, the mobile terminal 200 may search for neighbor base stations 100 periodically or according to a predetermined condition, and transmit information regarding the searched neighbor base stations 100 to a serving base station.

The controller 300 determines an active set for multi-cooperative transmission/reception for the mobile terminal 200 among, the neighbor base stations 100 searched for by the mobile terminal 200 to form a virtual cell, and schedules beam transmission of respective base stations included in the determined active set. Here, the active set is defined as a set of sectors providing a radio channel for data transmission/reception to the mobile terminal 200.

The controller 300 may control to transmit resource allocation information for each base station 100 to the mobile terminal 200 via an anchor base station or the respective base stations included in the active set. Here, the anchor base station denotes a base station of base stations participating in multi-cooperative transmission/reception that transfers resource allocation information scheduled by the controller 300 to the mobile terminal 200. A serving base station may be determined as the anchor base station, or a base station that transmits resource information for uplink/downlink first to the mobile terminal 200 among the base stations included in the active set may be determined as the anchor base station. However, the method for determining the anchor base station is not limited to the above methods but the anchor base station may be determined using various modified methods.

Figure 3:
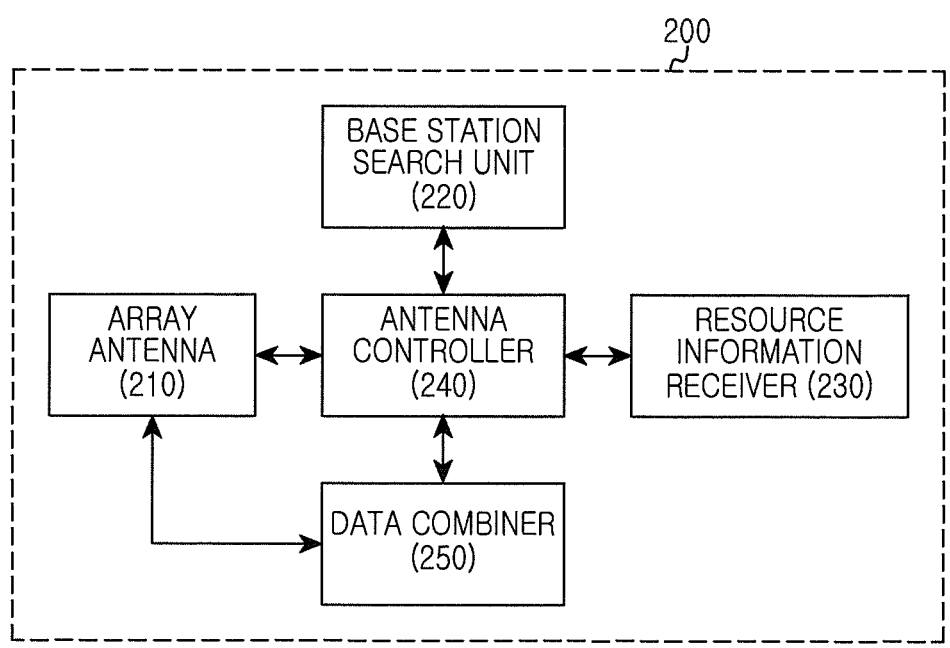
FIG. 3 illustrates a block diagram of a mobile terminal according to an exemplary embodiment of the present disclosure.

FIG. 3 illustrates a block diagram of a mobile terminal according to an exemplary embodiment of the present disclosure.

Referring to FIG. 3, the mobile terminal 200 may include an array antenna 210, a base station search unit 220, a resource information receiver 230, an antenna controller 240, and a data combiner 250.

The array antenna 210 may perform beam-forming with at least one base station 100 in an ultra high frequency band. That is, respective antennas forming the array antenna 210 may form a beam in a straight line direction, control the amplitude and phase of the respective antennas, find a beam whose beam direction coincides with a beam direction of a beam transmitted from the base station 100 to form a channel for data transmission/reception with a relevant base station 100, thereby obtaining an array gain.

The base station search unit 220 may search for neighbor base stations 100 periodically. Alternatively, a predetermined condition such as the example where the power of the mobile terminal 200 is initialized, the example where strength of a signal received from a serving base station becomes less than a set value, and the example where the mobile terminal 200 requests a soft handover, is met, the base station search unit 220 may search for neighbor base stations 100. At this point, the base station search unit 220 transmits information regarding searched base stations to a current serving base station.

The resource information receiver 230 may receive schedule information regarding beam transmission of neighbor base stations and resource information regarding uplink/downlink via a serving base station or a different neighbor base station from the controller 300 based on information regarding neighbor base stations transmitted via the serving base station.

The antenna controller 240 controls the array antenna according to the received schedule information and resource information to form a beam toward a base station transmitting a beam to the mobile terminal among the neighbor base stations, and form a channel with a relevant base station to transmit/receive data.

In the example where beam-forming is changed with respect to a plurality of neighbor base stations by the antenna controller 240 and signals are received from base stations, the data combiner 250 buffers the signals, and combines the signals received from base stations. For example, the data combiner 250 may sum received values of the signals or Log Likelihood Ratios (LLRs) of the signals. Further, the data combiner 250 may apply weights to each of the received values or the LLRs. Herein, the signals from the base stations are received in staggered transmission, in other words, are received in different time slots. Therefore, since the signals are not received simultaneously, the data combiner 250 should buffer the signals.

Figure 4:
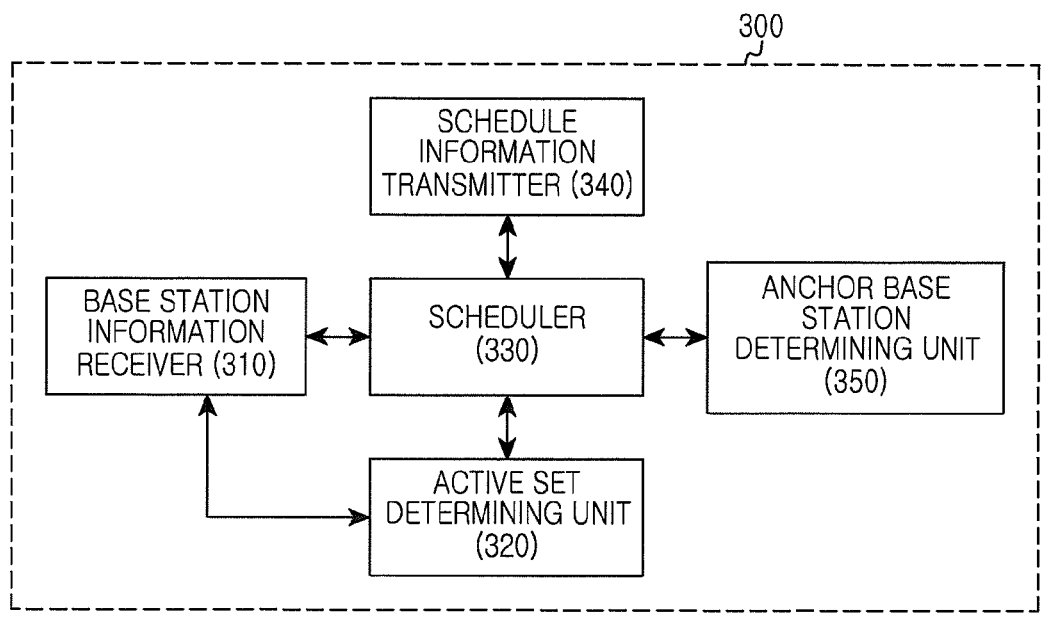
FIG. 4 illustrates a block diagram of a base station controller according to an exemplary embodiment of the present disclosure.

FIG. 4 illustrates a block diagram of a base station controller according to an exemplary embodiment of the present disclosure.

Referring to FIG. 4, the base station controller 300 may include a base station information receiver 310, an active set determining unit 320, a scheduler 330, a schedule information transmitter 340, and an anchor base station determining unit 350.

The base station information receiver 310 may receive information regarding at least one base station located in the neighborhood of the mobile terminal 200 via a serving base station of the mobile terminal 200. Information regarding the base stations in the neighborhood of the mobile terminal 200 includes an identification number of respective base stations, information regarding different mobile terminals in the neighborhood of respective base stations, and beam transmission information between respective base stations and different mobile terminals.

The active set determining unit 320 determines an active set for a plurality of base stations in the neighborhood of the mobile terminal 200 based on base station information received via the base station information receiver 310. That is, the active set determining unit 320 determines base stations that provide a radio channel for data transmission/reception to the mobile terminal 200 among base stations in the neighborhood of the mobile terminal 200.

The scheduler 330 schedules beam transmission to the mobile terminal 200 with respect to the base stations included in the active set determined by the active set determining unit 320, and allocates resource information for uplink/downlink. At this point, the scheduler 330 may schedule beam transmission so that respective base stations included in the active set do not transmit data during the same slot using a frame subdivided by time division of a slot basis, and allocate each resource information. That is, the scheduler 330 schedules beam transmission based on staggered transmission. An example of this frame structure is described below.

The schedule information transmitter 340 may transmit schedule information and resource allocation information by the scheduler 330 to the mobile terminal 200 via at least one of the base stations included in the active set.

The anchor base station determining unit 350 may determine one of the base stations included in the active set as an anchor base station. At this point, the anchor base station determining unit 350 may determine a serving base station for the mobile terminal 200 as the anchor base station, or determine a base station that transmits resource information for uplink/downlink first to the mobile terminal 200 among the base stations included in the active set as the anchor base station. In this example, the schedule information transmitter 340 may transmit schedule information and resource allocation information regarding neighbor base stations of the mobile terminal 200 to the mobile terminal 200 via the anchor base station.

Alternatively, the schedule information transmitter 340 may be realized to transmit resource information used for communication between a relevant base station and the mobile terminal 200 via respective base stations included in the active set instead of determining the anchor base station. In addition, the schedule information transmitter 340 may be realized to transmit schedule information and resource allocation information regarding the respective base stations included in the active set via the anchor base station determined by the anchor base station determining unit 350, and doubly transmit resource information used for communication between a relevant base station and the mobile terminal 200 via respective base stations excluding the anchor base station.

Figure 5:
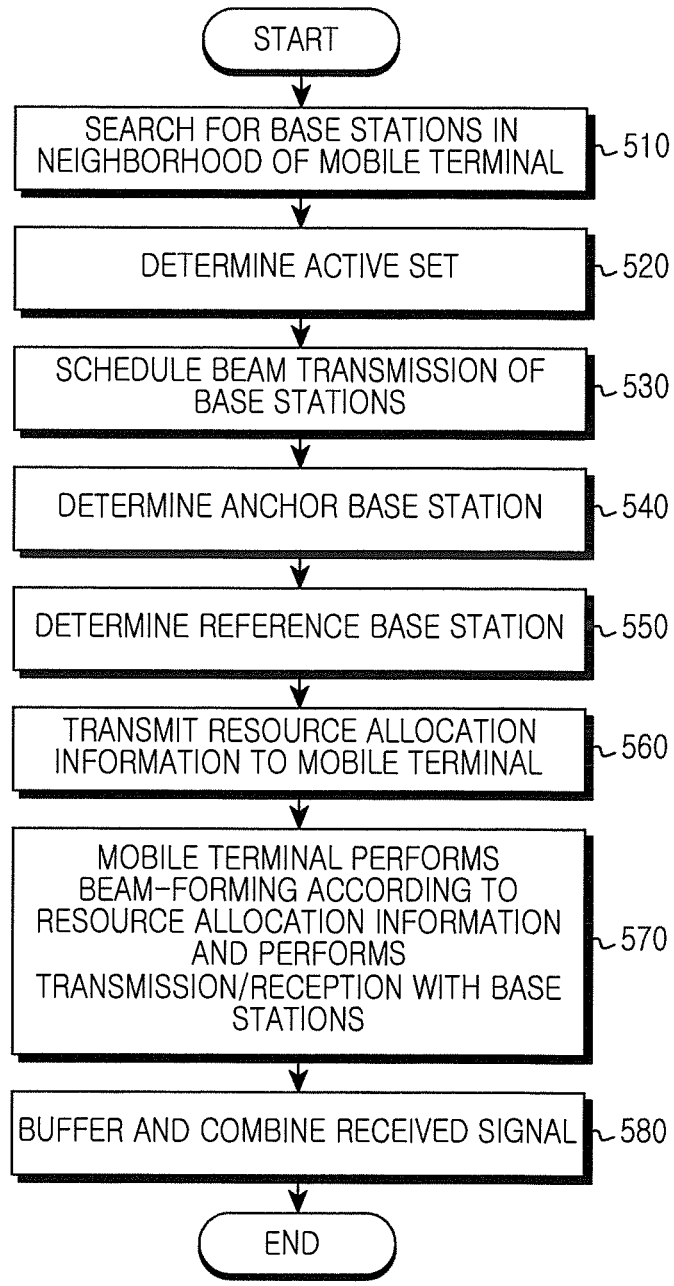
FIG. 5 illustrates a multi-cooperative transmission/reception method according to an exemplary embodiment of the present disclosure.

FIG. 5 is a flowchart illustrating a multi-cooperative transmission/reception method according to an exemplary embodiment of the present disclosure. The multi-cooperative transmission/reception method according to an exemplary embodiment of the present disclosure is described in more detail with reference to FIGS. 1 and 5.

The mobile terminal 200 may search for neighbor base stations periodically. Alternatively, a predetermined condition such as the example where the power of the mobile terminal 200 is initialized, the example where strength of a signal received from a serving base station becomes less than a set value, and the example where the mobile terminal 200 requests a soft handover, is met, the mobile terminal 200 may search for neighbor base stations (510). Here, the soft handover denotes a communication technique where the mobile terminal 200 sets connection with a target base station before ending connection with a serving base station 100, and sets connection with two base stations, that is, the serving base station and the target base station simultaneously in a predetermined region of a cell boundary, that is, a handover region to perform transmission/reception. Information regarding neighbor base stations searched for by the mobile terminal 200 is transmitted to the current serving base station 100.

The controller 300 receives the information regarding the neighbor base stations of the mobile terminal 200 via the serving base station 100, and determines an active set for multi-cooperate transmission/reception for the mobile terminal 200 among the received neighbor base stations (520). In addition, the controller 300 schedules beam transmission of respective base stations included in the determined active set (530).

Figure 6:
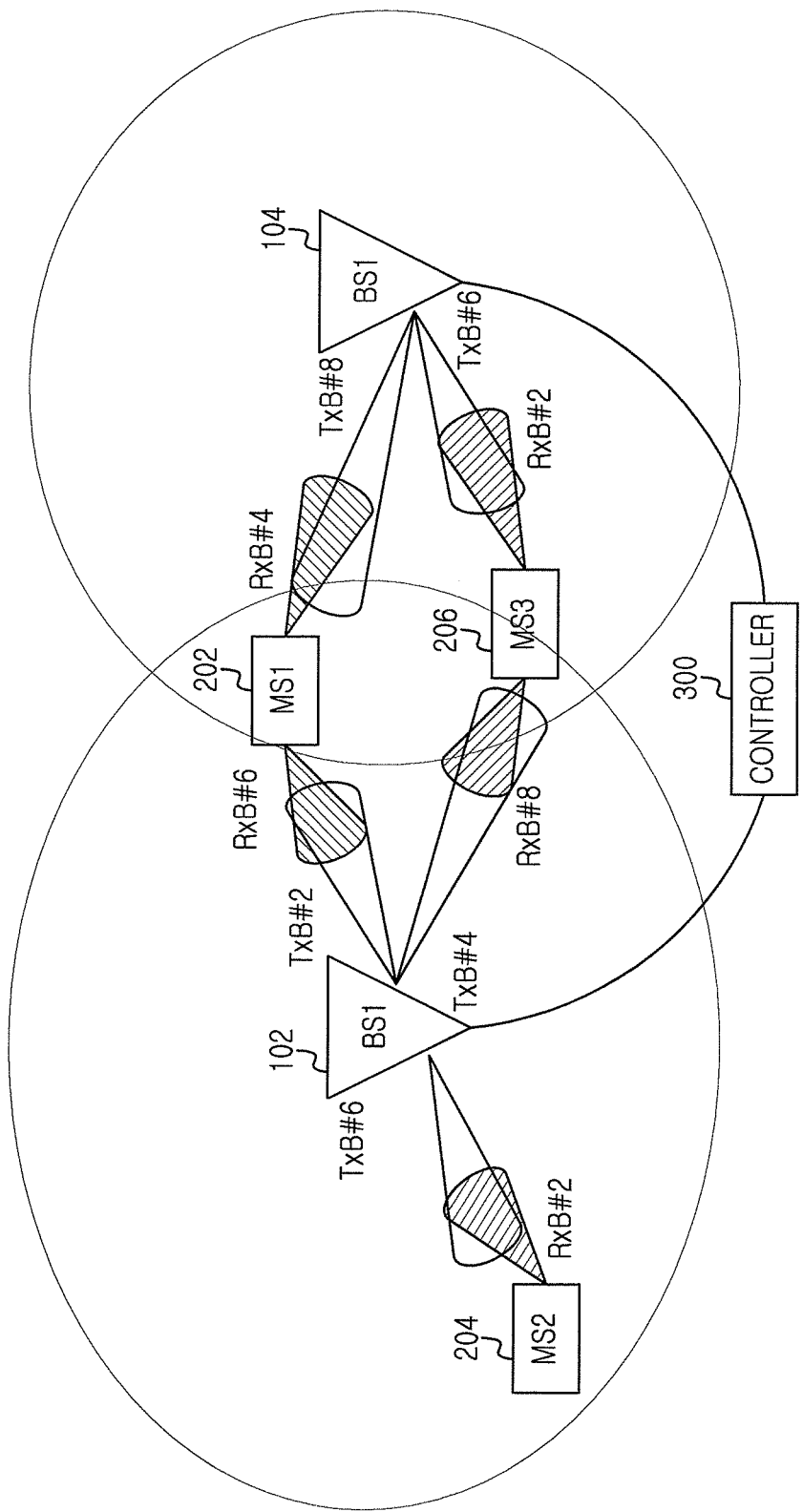
FIG. 6 illustrates scheduling for beam transmission of respective base stations included in an active set.

FIG. 6 illustrates scheduling for beam transmission of respective base stations included in an active set. In the drawing, different reference numerals are given to discriminate respective base stations and respective mobile terminals. In addition, it is assumed that respective base stations 102 and 104, and respective mobile terminals 202, 204, and 206 perform Tx beam-forming and Rx beam-forming, and the respective mobile terminals 202, 204, and 206 have one array antenna.

In this example, for the first mobile terminal 202 and the third mobile terminal 206 located at a cell boundary area, the first base station 102 and the second base station 104 may be found as neighbor base stations. For the second mobile terminal 204, the first base station 102 may be found as a neighbor base station. Information regarding the searched neighbor base stations may be transmitted to the controller 300 via a serving base station.

Figure 7:
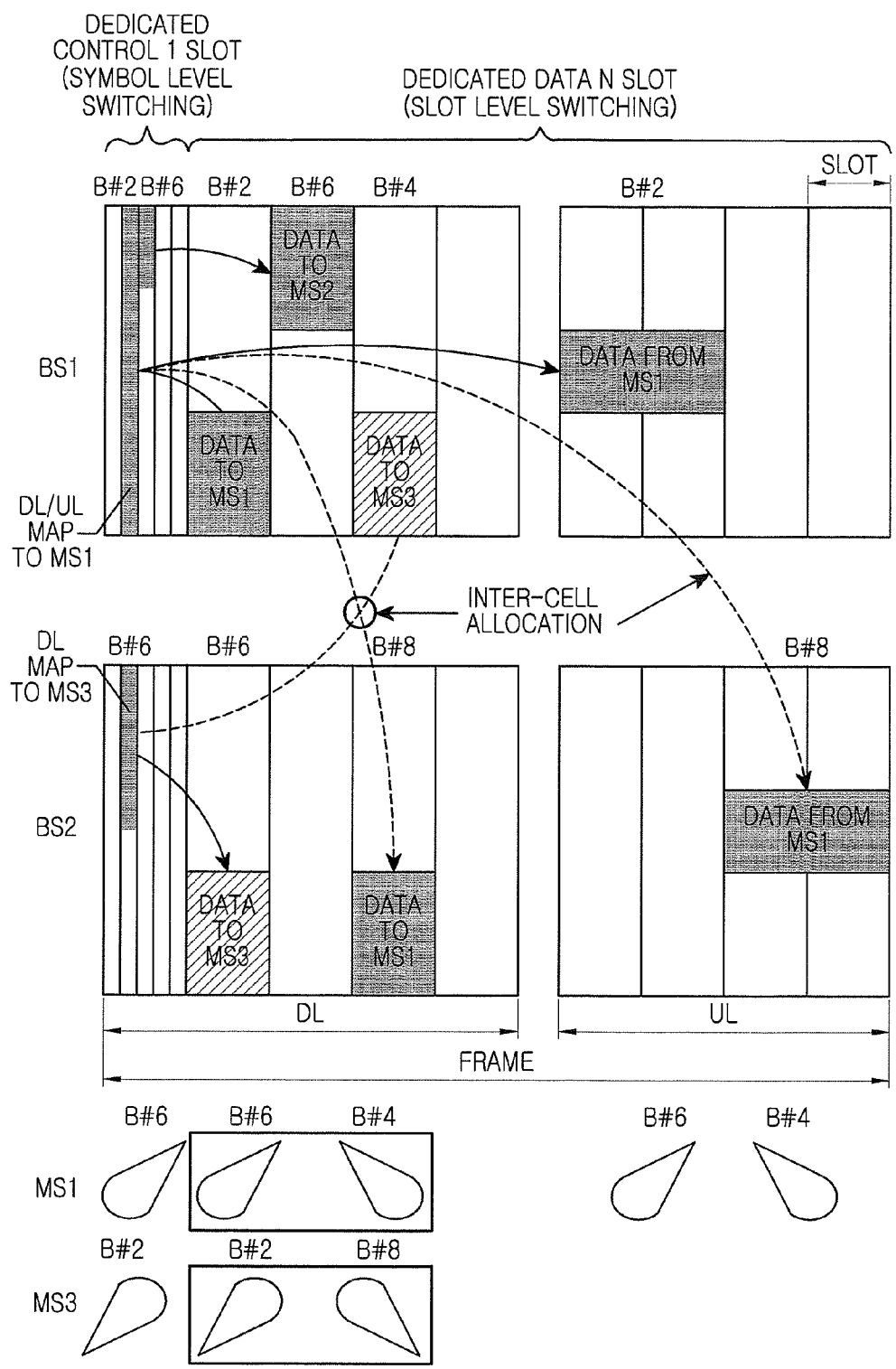
FIG. 7 illustrates an example of a frame structure to explain an operation principle of multi-cooperative transmission/reception according to an exemplary embodiment of the present disclosure.

The controller 300 schedules beam transmission for respective mobile terminals 202, 204, and 206 with respect to the first base station 102 and the second base station 104. For this purpose, the controller 300 may use a frame structure as illustrated in FIG. 7. At this point, a frame may include a DL frame and an UL frame. The DL frame may include a region for beam transmission control and a data transmission region. The UL frame may include a data transmission region. In addition, the frame may be subdivided by time division of a slot basis, and the controller 300 schedules so that respective base stations 102 and 104 do not transmit data during the same slot. For example, as illustrated in FIG. 7, the controller

300 may control the first base station 102 to transmit a beam via a beam number 2 and a beam number 6, and schedule to transmit data to the first mobile terminal 202 via the beam number 2, and transmit data to the second mobile terminal 204 via the beam number 6. In addition, the controller 300 may control the second base station 104 to transmit data to the third mobile terminal 206 via the beam number 6. At this point, a frame corresponding to each base station may include resource information allocated to a different base station. For example, with respect to the first mobile terminal 202 and the third mobile terminal 206 located at the cell boundary area between the first base station 102 and the second base station 104, a frame corresponding to the first base station 102 does not include a control signal for controlling beam transmission to the third mobile terminal 206 but includes resource allocation information of data transmission by the second base station 104 to display that data transmission by a different base station exists. Likewise, a frame corresponding to the second base station 104 does not include a control signal for controlling beam transmission to the first mobile terminal 202 but includes resource allocation information of data transmission by the first base station 102 to display that data transmission by a different base station exists.

Figure 8:
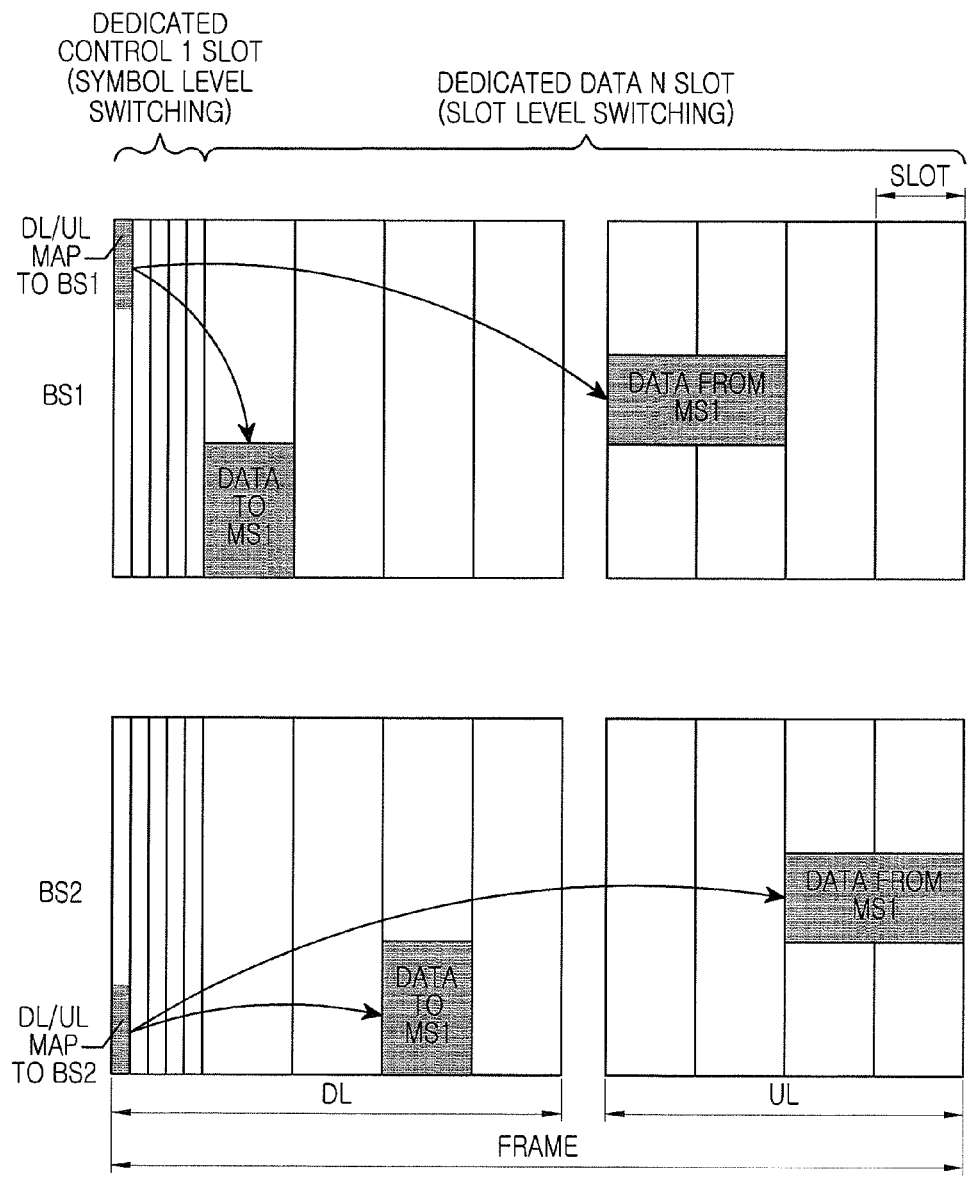
FIG. 8 illustrates a frame structure in an example embodiment of transmitting DL/UL resource information independently for each base station.
Figure 9:
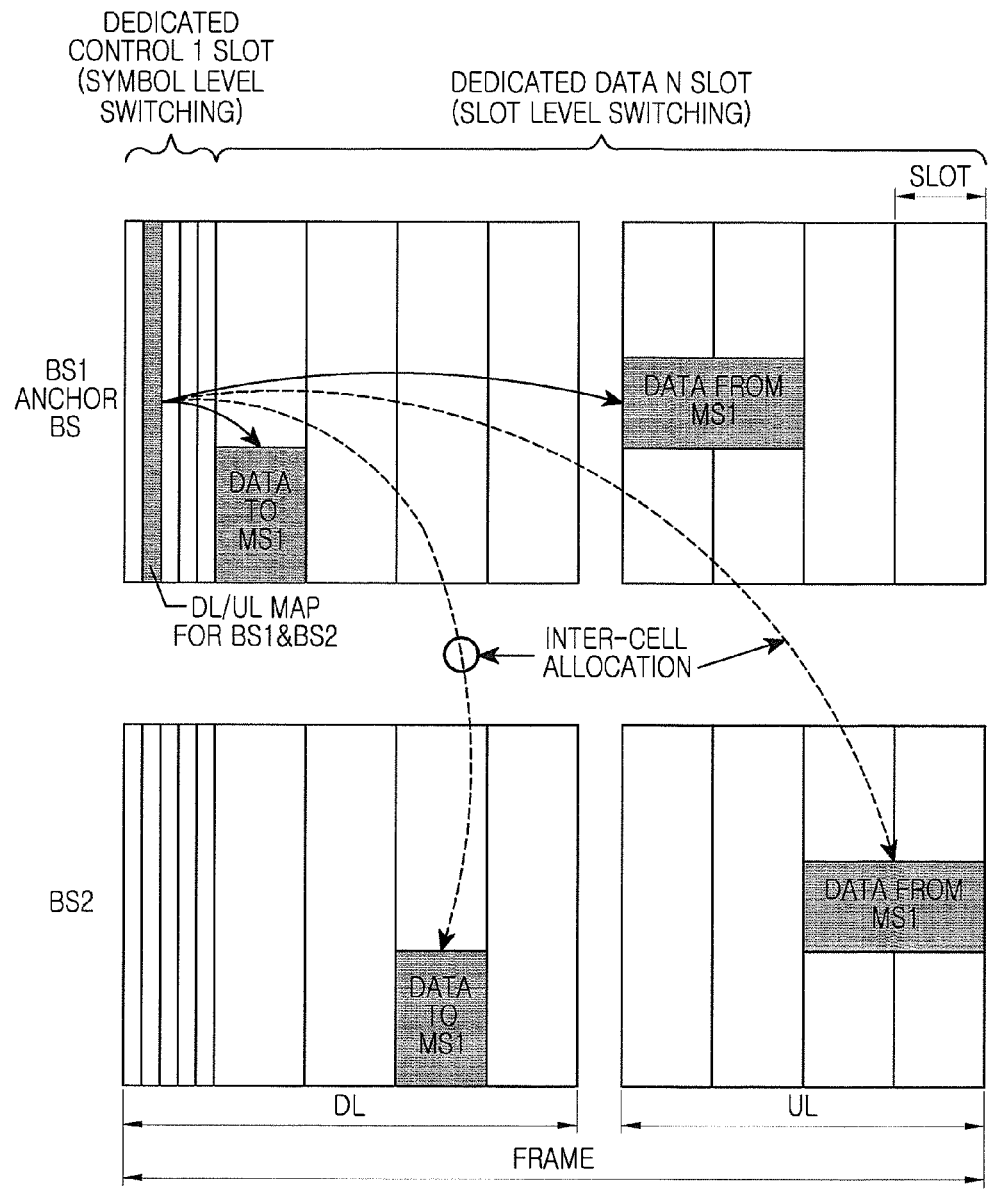
FIG. 9 illustrates a frame structure in the example embodiment where DL/UL resource information is transmitted by an anchor base station.

The controller 300 may control to transmit resource allocation information for downlink and uplink for each base station independently to a mobile terminal. For example, with respect to beam transmission of the first base station 102 and the second base station 104 to the first mobile terminal 202 of FIG. 4, the controller 300 may schedule resource allocation of a frame structure as illustrated in FIG. 8, and control the first base station 102 and the second base station 104 to transmit resource allocation information independently to the first mobile terminal 202.

Alternatively, the controller 300 may determine an anchor base station for transmitting resource allocation information to a relevant mobile terminal among base stations included in an active set (540). At this point, as described above, a serving base station may be determined as the anchor base station, or a base station that transmits resource information for uplink/downlink first to the mobile terminal 200 among the base stations included in the active set may be determined as the anchor base station. However, the method for determining the anchor base station is not limited to the above-described methods. At this point, the anchor base station transmits resource allocation information including DL MAP information, UL MAP information, and cell ID information of respective base stations included in the active set to a relevant mobile terminal. For example, with respect to beam transmission of the first base station 102 and the second base station 104 to the first mobile terminal 202 of FIG. 6, the first base station 102 determined as an anchor base station may transmit resource allocation information of a frame structure illustrated in FIG. 9 to the first mobile terminal 202.

Figure 10:
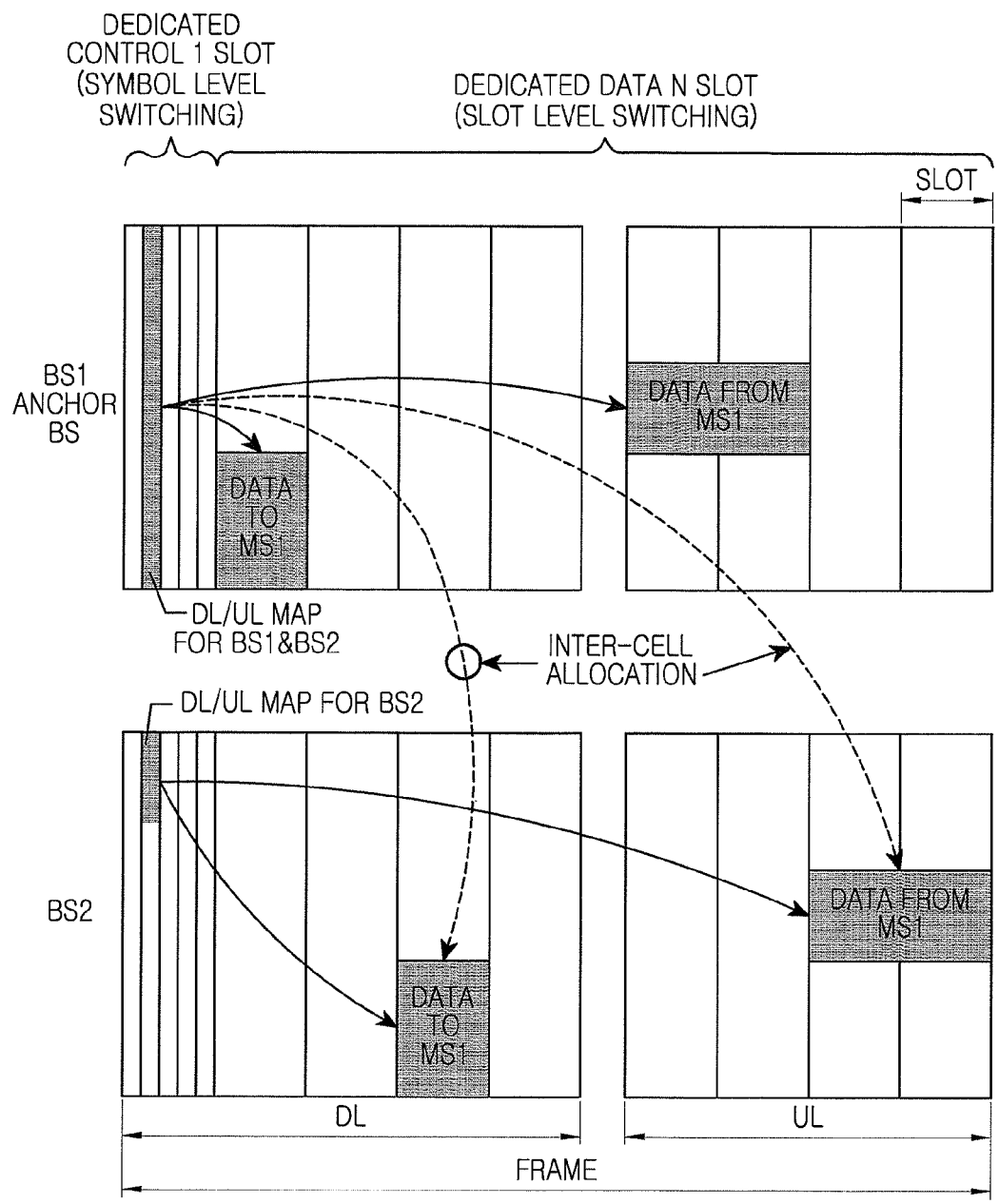
FIG. 10 illustrates a frame structure in the example embodiment where DL/UL resource information is doubly transmitted by an anchor base station and the rest of base stations.

Alternatively, the controller 300 may be realized to determine an anchor base station for transmitting resource allocation information to a relevant mobile terminal among base stations included in an active set, and then transmit the resource allocation information to the relevant mobile terminal via the anchor base station, and simultaneously allow the other base stations to transmit resource information of themselves independently to the relevant mobile terminal. For example, with respect to beam transmission of the first base station 102 and the second base station 104 for the first mobile terminal 202 of FIG. 6, the first base station 102 determined as an anchor base station may transmit resource allocation information of a frame structure illustrated in FIG. 9 to the first mobile terminal 202. The second base station 104 may transmit resource information of the second base station for the first mobile terminal 202 independently. In this example, resource allocation information of the second base station 104 may be doubly transferred as illustrated in FIG. 10.

Figure 11:
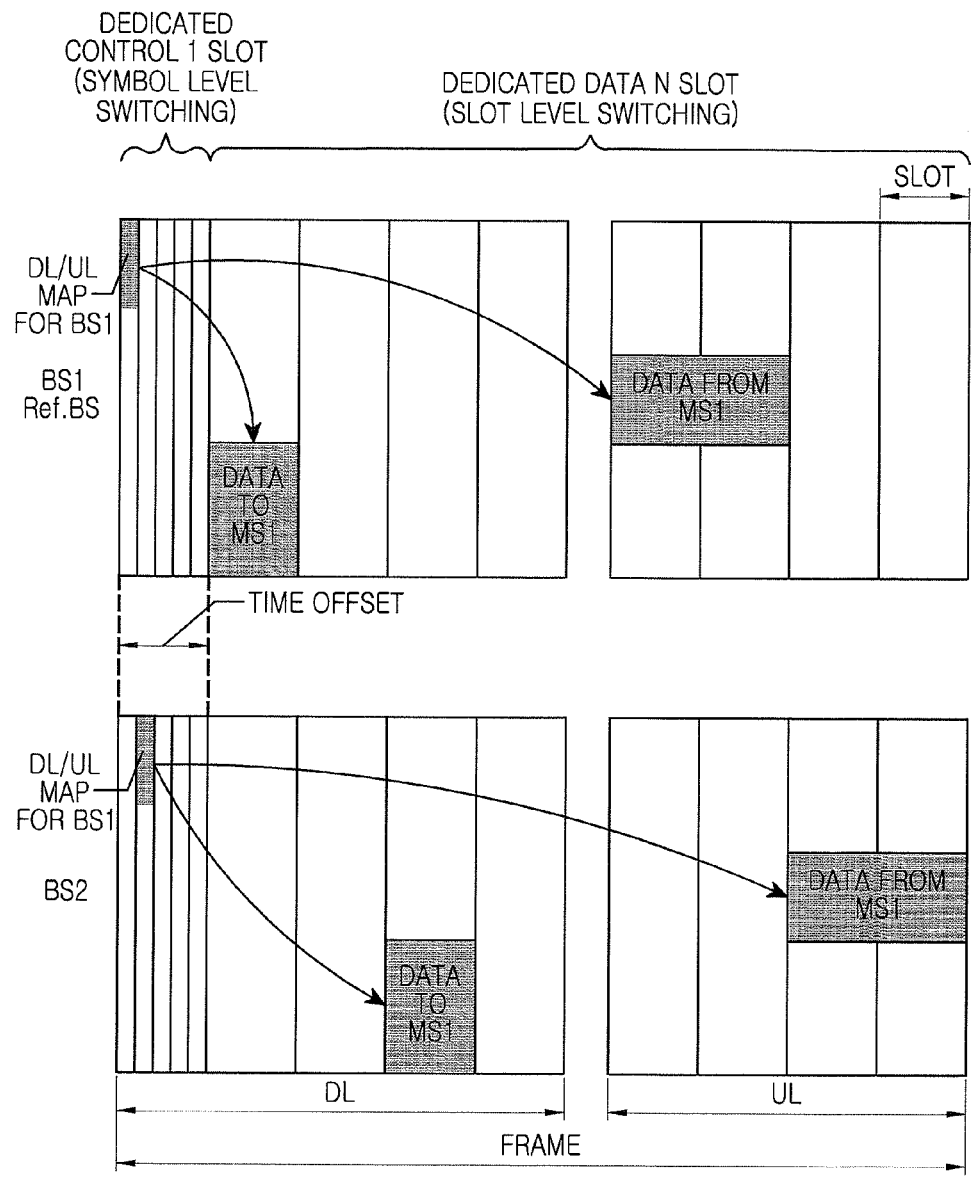
FIG. 11 illustrates a frame structure in the example embodiment where DL/UL resource information is sequentially transmitted for each base station.

Alternatively, the controller 300 may determine a base station that transmits resource information first to a relevant mobile terminal among base stations included in an active set as a reference base station (550), and control to offset the other base stations excluding the reference base station by a set time among the base stations included in the active set to sequentially transmit resource information (560). At this point, it is preferable that information regarding the base station determined as the reference base station is shared between the other base stations included in the active set, and an order may be determined in an ID increasing order or an ID decreasing order based on an ID of the reference base station. For example, with respect to beam transmission of the first base station 102 and the second base station 104 for the first mobile terminal 202 of FIG. 6, as illustrated in FIG. 11, the first base station 102 is determined as a reference base station, resource information is transmitted from the first base station 102 to the first mobile terminal 202, and then beam transmission of the second base station 104 is controlled after a set offset, so that resource information may be transmitted to the first mobile terminal 202.

Based on the transmitted resource allocation information, each mobile terminal performs beam-forming according to the received resource allocation information to perform transmission/reception with respective base stations included in the active set (570). Herein, signals from the base stations in the active set are received in a manner of staggered transmission, in other words, are received in different time slots. For example, in the example where resource allocation information illustrated in FIG. 7 is transmitted to the first mobile terminal 202, the first mobile terminal 202 may set a beam using Rx beam number 6 in a section of a beam number 2 of the first base station 102, and set a beam using, Rx beam number 4 in a section of a beam number 8 of the second base station 104 depending on the received resource allocation information.

At this point, respective mobile terminals 202, 204, and 206 may perform transmission/reception of signal via respective base stations 102 and 104 by buffering and combining signal received from the respective base stations 102 and 104 (580). For example, the mobile terminals 220, 224 and 206 may sum received values of the signals or LLRs of the signals. Further, the mobile terminals 220, 224 and 206 may apply weights to each of the received values or the LLRs. Herein, the signals from the base stations 102 and 104 are received in staggered transmission, in other words, are received in different time slots.

Figure 12:
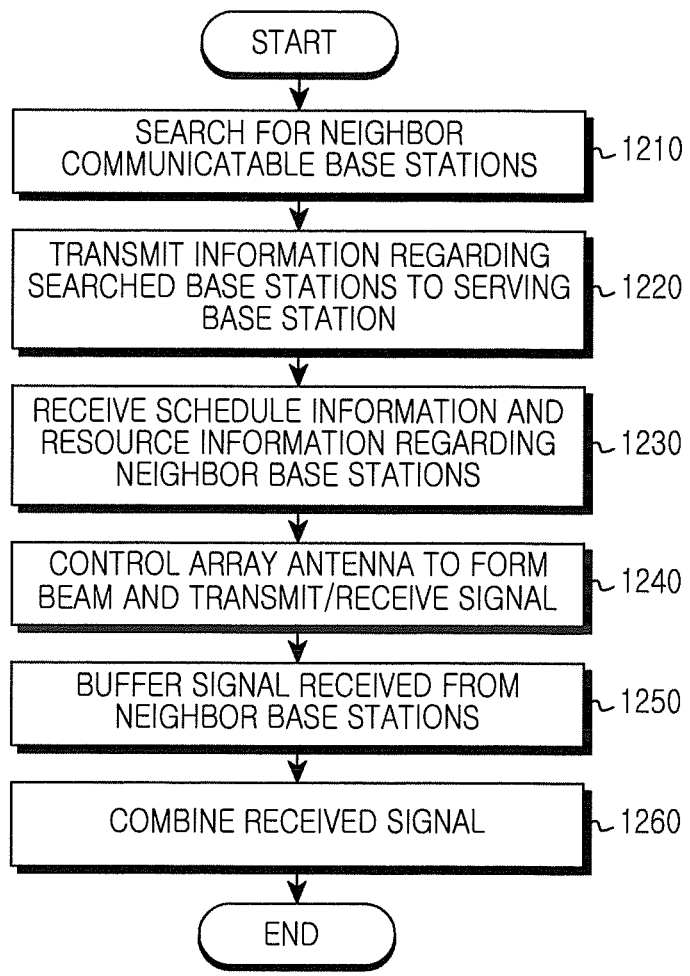
FIG. 12 illustrates a communication method of a mobile terminal according to an exemplary embodiment of the present disclosure.

FIG. 12 illustrates a communication method of a mobile terminal according to an exemplary embodiment of the present disclosure.

Referring to FIGS. 3 and 12, the base station search unit 220 may search for neighbor base stations 100 periodically or according to a predetermined condition (1210). At this point, the base station search unit 220 transmits information regarding the searched base stations to a current serving base station (1220).

The resource information receiver 230 may receive schedule information regarding beam transmission of neighbor base stations and resource information regarding uplink/downlink via a serving base station or a neighbor different base station from the controller 300 based on information regarding neighbor base stations transmitted via the serving base station (1230).

The antenna controller 240 controls an array antenna according to the received schedule information and resource information to form a beam toward a base station that transmits a beam to the antenna controller 240 among, neighbor base stations, and form a channel with a relevant base station to transmit/receive signal (1240).

In the example where beam forming is changed by the antenna controller 240 with respect to a plurality of neighbor base stations and signals are received from respective base stations, the data combiner 250 buffers the signals (1250), and combines the signals received from the base stations (1260). Herein, the signals from the base stations are received in a manner of staggered transmission, in other words, are received in different time slots.

Figure 13:
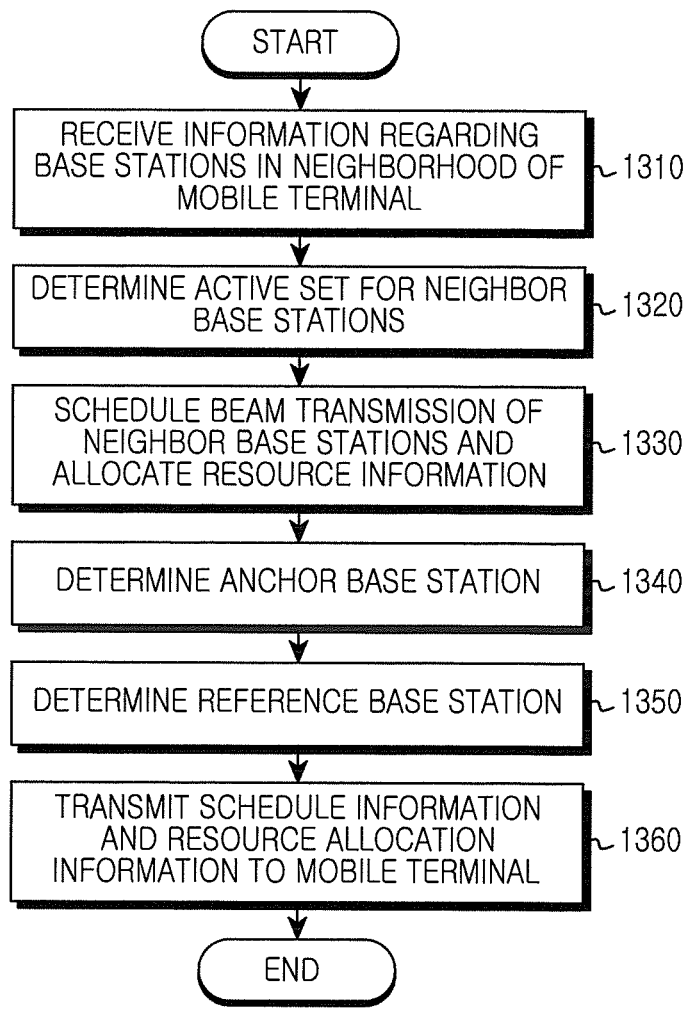
FIG. 13 illustrates a control method by a base station controller according to an exemplary embodiment of the present disclosure.

FIG. 13 illustrates a control method by a base station controller according to an exemplary embodiment of the present disclosure.

Referring to FIGS. 4 and 13, the base station information receiver 310 may receive information regarding at least one base station located in the neighborhood of the mobile terminal 200 via a serving base station of the mobile terminal 200 (1310). The information regarding the base stations in the neighborhood of the mobile terminal 200 includes an identification number of respective base stations, information regarding different mobile terminals in the neighborhood of respective base stations, and beam transmission information between respective base stations and different mobile terminals.

The active set determining unit 320 determines an active set regarding a plurality of base stations in the neighborhood of the mobile terminal 200 based on the base station information received via the base station information receiver 310 (1320). That is, the active set determining unit 320 determines base stations providing a radio channel for data transmission/reception to the mobile terminal 200 among the base stations in the neighborhood of the mobile terminal 200.

The scheduler 330 schedules beam transmission to the mobile terminal 200 with respect to base stations included in the active set determined by the active set determining unit 320, and allocates resource information regarding uplink/downlink (1330). At this point, the scheduler 330 may schedule beam transmission so that respective base stations included in the active set do not transmit data during the same slot using a frame subdivided by time division of a slot basis, and allocate each resource information.

The anchor base station determining unit 350 may determine one of base stations included in the active set as an anchor base station (1340). At this point, the anchor base station determining unit 350 may determine a serving base station for the mobile terminal 200 as the anchor base station, or a base station transmitting resource information regarding uplink/downlink first to the mobile terminal 200 among the base stations included in the active set as the anchor base station. In this example, the schedule information transmitter 340 may transmit schedule information and resource allocation information regarding neighbor base stations of the mobile terminal 200 to the mobile terminal 200 via the anchor base station (1360).

Alternatively, the schedule information transmitter 340 may be realized to transmit resource information used for communication between a relevant base station and the mobile terminal 200 via respective base stations included in the active set instead of determining the anchor base station. In this example, the schedule information transmitter 340 may determine a base station that transmits resource information first to a relevant mobile terminal as a reference base station with respect to the base stations included in the active set (1350), and control to offset the other base stations excluding the reference base station among the base stations included in the active set by a set time to sequentially transmit resource information (1360). At this point, it is preferable that information regarding the base station determined as the reference base station is shared between the other base stations included in the active set, and an order may be determined in an ID increasing order or an ID decreasing order based on an ID of the reference base station.

Alternatively, the schedule information transmitter 340 may be realized to transmit schedule information and resource allocation information regarding respective base stations included in the active set via the anchor base station determined by the anchor base station determining unit 350, determine a reference base station with respect to respective base stations excluding the anchor base station (1350), and sequentially transmit resource information used for communication between a relevant base station and the mobile terminal 200 according to the above-described method doubly with the anchor base station (1360).

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A wireless communication system, the system comprising:
   a mobile terminal having an array antenna, the mobile terminal configured to search for neighbor base stations;
   a controller configured to determine an active set for multi-cooperative transmission/reception with respect to the mobile terminal among searched neighbor base stations, and schedule beam transmission of each base station included in the determined active set; and
   at least one base station configured to perform transmission/reception with the mobile terminal using beam-forming in an ultra high frequency band, and providing resource information regarding uplink/downlink transmissions of each base station included in the active set to the mobile terminal based on the scheduling by the controller.

2. The system of claim 1, wherein the base stations included in the active set and the mobile terminal are configured to perform transmission/reception using beam-forming in one of a an ultra high frequency band and a millimeter wave band.

3. A mobile terminal comprising:
   an array antenna configured to perform beam-forming with at least one base station in an ultra high frequency band;
   a base station search unit configured to search for neighbor base stations and transmit information regarding the searched base stations to a current serving base station;
   a resource information receiver configured to receive scheduling information regarding beam transmission of the searched base stations and resource information regarding uplink/downlink transmissions from a controller based on the transmitted information regarding the base stations; and
   an antenna controller configured to control the array antenna according to the scheduling information and the resource information to form a beam corresponding to the beam transmission of a neighbor base station and transmit/receive data.

4. The mobile terminal of claim 3, further comprising a data combiner configured to coherent-combine data received via the beam sequentially formed.

5. A base station controller comprising:
a base station information receiver configured to receive information regarding at least one base station positioned in a neighborhood of a mobile terminal;
an active set determining unit configured to determine an active set with respect to a plurality of base stations received via the base station information receiver;
a scheduler configured to schedule beam transmission for base stations included in the active set and allocate resource information for uplink/downlink transmissions; and
a schedule information transmitter configured to transmit schedule information and resource allocation information by the scheduler to the mobile terminal via at least one of the base stations included in the active set.

6. The base station controller of claim 5, further comprising:
an anchor base station determining unit configured to determine an anchor base station among the base stations included in the active set,
wherein the schedule information transmitter is configured to transmit the schedule information and the resource allocation information to the mobile terminal via the anchor base station.

7. The base station controller of claim 5, wherein the scheduler is configured to schedule beam transmission and allocates resource information so that respective base stations included in the active set do not transmit data during the same slot using a frame subdivided via time division of a slot basis.

8. A multi-cooperative transmission/reception method, the method comprising:
searching for base stations in a neighborhood of a mobile terminal;
determining an active set for multi-cooperative transmission/reception with respect to the mobile terminal among the searched base stations;
scheduling beam transmission of the base stations included in the determined active set; and
transmitting resource allocation information for uplink/downlink transmissions of respective base stations included in the active set to the mobile terminal based on the scheduling.

9. The method of claim 8, wherein the base stations included in the active set and the mobile terminal perform transmission/reception using beam-forming in an ultra high frequency band.

10. The method of claim 8, wherein the base stations included in the active set and the mobile terminal perform transmission/reception using beam-forming in a millimeter wave band.

11. A communication method of a mobile terminal, the method comprising:
searching for neighbor base stations;
transmitting information regarding the searched base stations to a current serving base station;
receiving scheduling information regarding beam transmission of the searched base stations and resource information regarding uplink/downlink transmissions from a controller based on the transmitted information regarding the base stations; and
controlling an array antenna according to the scheduling information and the resource information to form a beam corresponding to the beam transmission of a neighbor base station and transmit/receive data.

12. The method of claim 11, further comprising performing beam-forming according to the scheduling information and the resource information to perform transmission/reception with at least one of the neighbor base stations and coherent-combining data received from each of the searched base stations.

13. The method of claim 12, further comprising buffering data received from at least one of the neighbor base stations.

14. A method for controlling a base station, the method comprising:
receiving information regarding at least one base station located in a neighborhood of a mobile terminal;
determining an active set for a plurality of base stations received via a base station information receiver;
scheduling beam transmission regarding the base stations included in the active set and allocating resource information for uplink/downlink transmissions; and
transmitting scheduling information and resource allocation information to the mobile terminal via at least one of the base stations included in the active set.

15. The method of claim 14, further comprising:
determining an anchor base station among the base stations included in the active set,
wherein transmitting the scheduling information and the resource allocation information comprises transmitting the scheduling information and the resource allocation information to the mobile terminal via the anchor base station.

16. The method of claim 15, wherein transmitting the scheduling information and the resource allocation information comprises transmitting resource information used for communication with the mobile terminal to the mobile terminal via a base station except the anchor base station among the base stations included in the active set.

17. The method of claim 15, wherein transmitting the scheduling information and the resource allocation information comprises transmitting Down Link (DL) MAP information, Up Link (UL) MAP information, and cell Identification (ID) information of the base stations included in the active set to the mobile terminal via the anchor base station.

18. The method of claim 14, wherein transmitting the scheduling information and the resource allocation information comprises transmitting resource information used for communication with the mobile terminal to the mobile terminal via the base stations included in the active set.

19. The method of claim 14, further comprising:
determining a base station that transmits the resource information first among the base stations included in the active set as a reference base station,
wherein transmitting the scheduling information and the resource allocation information comprises allowing the base stations except the reference base station among, the base stations included in the active set to offset by a set time to sequentially transmit the resource information.

20. The method of claim 14, wherein transmitting the scheduling information and the resource allocation information comprises scheduling, beam transmission and allocating, resource information so that the respective base stations included in the active set do not transmit data during the same slot using a frame subdivided by time division of a slot basis.

* * * * *